(Model.)
E. POWELL.
SULKY PLOW.
No. 263,577. Patented Aug. 29, 1882.
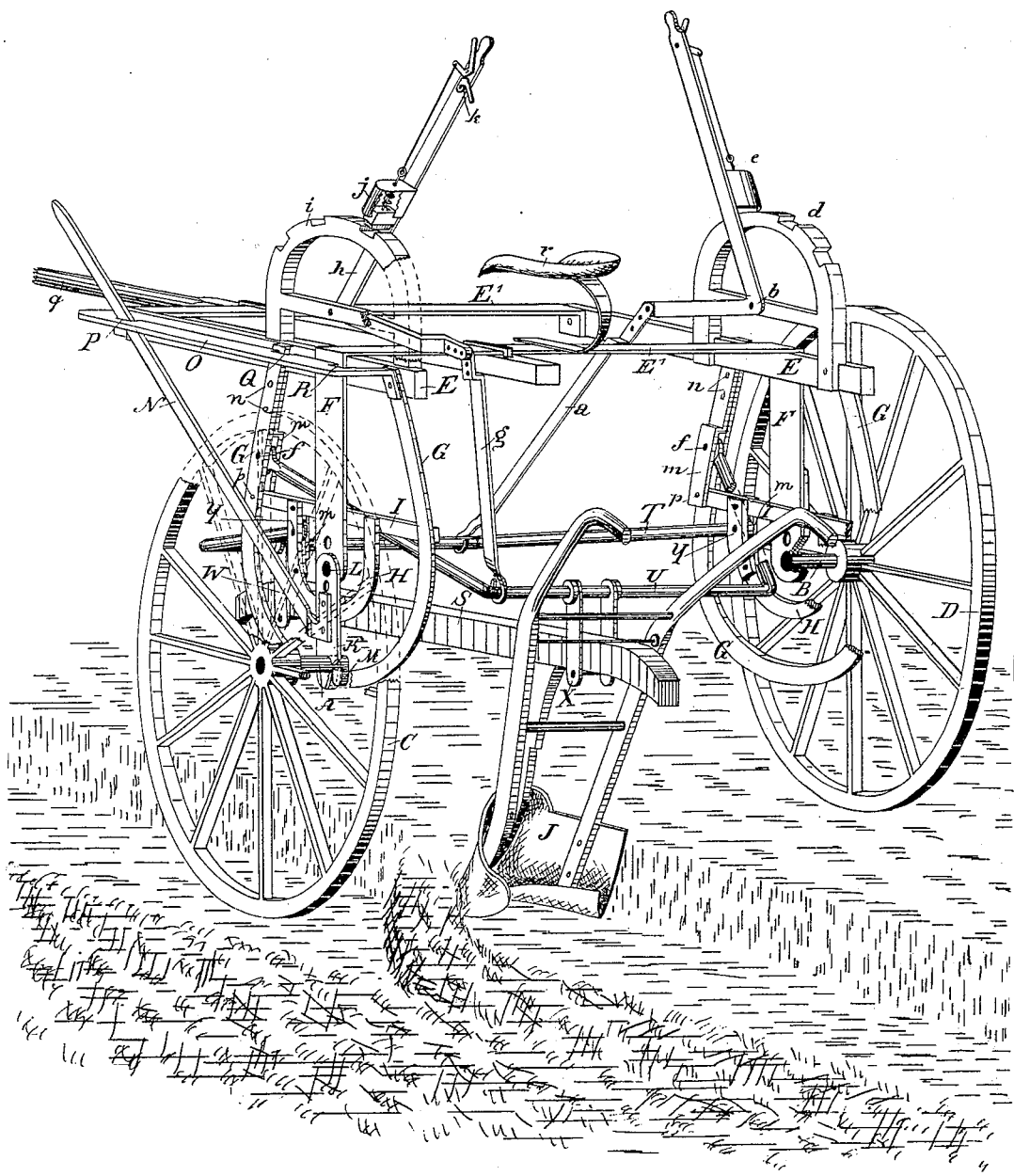
WITNESSES:
Otto Beyer
C. Sedgwick
INVENTOR:
E. Powell
BY Munn & Co
ATTORNEYS.

UNITED STATES PATENT OFFICE.

EUGENE POWELL, OF DELAWARE, OHIO.

SULKY-PLOW.

SPECIFICATION forming part of Letters Patent No. 263,577, dated August 29, 1882.

Application filed April 5, 1882. (Model.)

*To all whom it may concern:*

Be it known that I, EUGENE POWELL, of Delaware, in the county of Delaware and State of Ohio, have invented a new and Improved Sulky-Plow, of which the following is a full, clear, and exact description.

My invention relates to improvements in sulky-plows; and it consists in the peculiar construction and arrangement of parts, as hereinafter fully described.

Reference is to be had to the accompanying drawing, forming a part of this specification, in which my improved sulky-plow is represented in perspective view, some of the parts being broken out.

To connect the short axles A and B for the wheels C and D with the sulky-frame E in a substantial arrangement, I make the upright frames of curved bars G H and the cross-bar I, connecting bars G H together—bars G to beams E and bars I to pendants F—thus making a very substantial wheel-truck or sulky to carry the plow J. The axle B for the wheel D, which runs on the land side, is rigidly attached to the lower end of frame-bar F; but the axle A for the wheel C, which runs in the furrow, is connected to a short bar, K, which is pivoted to a bar, F, at L, the said axle being rigidly attached to said short bar K, and having a hook-head, M, turned down inside of bar G, along which it swings in raising and lowering wheel C, said bar G being curved to the radius of center L. The lever N is attached to this bar K for swinging the wheel C, and said lever swings along the slotted and notched bar O to be fastened in notches P, Q, or R, according as the wheel is to be set. In notch P, where the lever is shown in the drawing, said lever holds the wheel in the position for running along the furrow. In the other notches it supports the frame lower down on the wheel for running along the road.

The plow-beam S is connected to the truck by two cranked rods or bails, T U—to the first by its front end and to the other near the rear. The connection is made by means of clevises W and X. It is by these connections that the plow is drawn along the ground, regulated as to the depth of the furrow, and lifted and carried above ground. The bail T is pivoted to the frame at Y near the axles, and it extends forward therefrom suitably for carrying the clevis W to connect the front end of the plow-beam. From the front cross-bar of this bail it is connected by rod $a$ with cranked lever $b$, by which it is supported high or low, as required, to regulate the draft on the plow-beams by setting said lever in the notched rack $d$ by its latch $e$.

The bail U is supported at the front side of the frame on pivots $f$, and at the rear it is connected by rod $g$ with the cranked lever $h$, which is employed to carry the plow above ground, said lever being shifted over to the front on its notched bar $i$, and fastened by its latch $j$ to hold the plow up above the ground. This bail has longer sweep than the other in order to lift the plow to the required height. When the plow is at work the latch $j$ is fastened up by the dog $k$ to allow the lever $h$ to swing freely, and permit the plow to run as it will, the depth being controlled entirely by the front bail, T. When the bails T and U are connected to the frame there is a stay cleat or cap, $m$, firmly riveted onto the frame for the support of pivot-bolts $f$ and $y$ at one end, and also for enabling the pivot-bolt nuts to be screwed up tight, so that they will not work loose. The caps for bail U are riveted to bar G at $n$ and to cross-bar I at $p$, and caps for bail T are also riveted at one end to bars I, the other ends being riveted to bars H.

$q$ represents the pole for the horses, and $r$ the driver's seat, the latter being mounted on one of the cross-bars E' of the truck-frame. It will be noticed that the construction of the vertical portions of the frame, by which the axles are connected to the top frame, is calculated to afford great strength and rigidity with small and light material.

It will be noticed that the suspended plow-beam prevents dragging of the bails T U along weeds, cornstalks, &c., and affording greater protection to the bails than if the same were arranged below the beam.

A notched locking-bar, O, may also be attached to both sides of frame E' and the wheels C D be interchangeable—that is to say, the wheel C, with attached axle A and a bar and lever, K N, may be adjusted at the opposite side of the frame F to that shown, thus permitting the use of both right and left hand plows.

The bar K and frame F may also be provided with a series of pivoting-holes, as at L, for adjusting the depression of wheel C in accordance with the working depth of the plow, and the connections between cranked levers *b h* may be rendered adjustable by a series of pivoting-holes for the bolts connecting the rods *a g* with the said levers, as will be readily understood.

Having thus fully described my invention, I claim as new and desire to secure by Letters Patent—

1. An axle-supporting frame for sulky-plows, consisting of the curved bar G, the cross-bar I, the curved bar H, having its ends secured to the said cross-bar, and the depending bar F, substantially as herein shown and described.

2. In a sulky-plow, the combination, with the side bar, E, and the axle A, having hooked head M, of the curved bars G H, the cross-bar I, the depending bar F, the pivoted bar K, and lever N, substantially as and for the purpose set forth.

EUGENE POWELL.

Witnesses:
T. E. POWELL,
FRANK A. KAUFFMAN.